(12) United States Patent
Kikuchi et al.

(10) Patent No.: US 7,498,701 B2
(45) Date of Patent: Mar. 3, 2009

(54) CONTROLLER-INTEGRATED ROTATING ELECTRICAL MACHINE

(75) Inventors: Masao Kikuchi, Tokyo (JP); Hiroyuki Akita, Tokyo (JP); Masaki Kato, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 464 days.

(21) Appl. No.: 11/300,487

(22) Filed: Dec. 15, 2005

(65) Prior Publication Data
US 2006/0152095 A1   Jul. 13, 2006

(30) Foreign Application Priority Data
Dec. 20, 2004   (JP)   ............................ P2004-367909

(51) Int. Cl.
*H02K 7/00*   (2006.01)
(52) U.S. Cl. ...................................... 310/68 B; 310/71
(58) Field of Classification Search ............... 310/68 R, 310/68 B, 68 D, 71
See application file for complete search history.

(56) References Cited

U.S. PATENT DOCUMENTS 6,992,409 B2 *  1/2006  Torii et al. .................... 310/52

2003/0173839 A1 *  9/2003  Torii et al. .................... 310/52

FOREIGN PATENT DOCUMENTS

| JP | 63-181645 | 7/1988 |
| JP | 8-308140 A | 11/1996 |
| JP | 09-117090 | 5/1997 |
| JP | 11-127583 A | 5/1999 |
| JP | 2003-225000 A | 8/2003 |
| JP | 2003-274606 | 9/2003 |

* cited by examiner

*Primary Examiner*—Dang D Le
(74) *Attorney, Agent, or Firm*—Sughrue Mion, PLLC

(57) ABSTRACT

A controller-integrated rotating electrical machine includes: a power element disposed adjacent to a rotating electrical machine main body and controlled to perform control of energization to the rotating electrical machine main body; a control circuit disposed adjacent to the power element in the longitudinal direction and at a side opposite to the rotating electrical machine main body to control the power element; a power line connecting the rotating electrical machine main body to the power element and having a straight line portion having a substantially straight line shape; and a current detector disposed at the straight line portion and detecting a line current flowing between the power element and the rotating electrical machine main body via the power line at the straight line portion so that an output from the current detector is used by the control circuit for the energization control.

19 Claims, 7 Drawing Sheets

CONTROLLER-INTEGRATED ROTATING ELECTRICAL MACHINE

BACKGROUND OF THE INVENTION

1. Field of the Invention

This invention relates to a rotating electrical machine integrated with a controller, wherein the rotating electrical machine such as a motor and a generator is integrated with the controller controlling outputs of the rotating electrical machine.

2. Description of the Related Art

A conventional controller of a rotating electrical machine is generally provided at a position detached from the rotating electrical machine and, as disclosed in Patent Literature 1, for example, constituted of an inverter circuit, a control circuit, a semiconductor current element with an output conductor current detection magnetic core, and an output signal amplification circuit housed in a housing different from that housing the rotating electrical machine. The current detection element with core, the amplification circuit, and the control circuit are mounted on an identical substrate.

Recently, a controller-integrated rotating electrical machine obtainable by integrating a controller with a rotating electrical machine has come under study, and one example of such controller-integrated rotating electrical machine is disclosed in Patent Literature 2. In Patent Literature 2, a controller (voltage controller) of a rotating electrical machine is mounted on the rotating electrical machine, and this controller-integrated rotating electrical machine has plural high side switches and plural low side switches serving as semiconductor switching elements and is provided with an output controller for in-vehicle generator. The rotating electrical machine also has the output controller for a vehicle which is provided with an AC/DC power conversion unit applying a power generation voltage for the generator to a battery after commutating the voltage, a field current controller constituted of a switching element interrupting a field current for energizing a field coil, and a voltage controller including a semiconductor integrated circuit maintaining the voltage of the battery at a predetermined value by controlling one of the AC/DC power conversion unit and the field current controller. In this controller-integrated rotating electrical machine, control on outputs of the rotating electrical machine is adjusted by detecting an interphase voltage.

Patent Literature 1: JP-A-11-127583 (FIG. 3 and description thereof)

Patent Literature 2: JP-A-2003-225000 (FIG. 7 and description thereof)

As a current detection element, a magnetic detection element detecting intensity of a magnetic field generated when a current is supplied is widely used as a high accuracy detection unit. However, in view of a strong demand for structural reliabilities such as shake resistance and heat resistance, a constitution achieving positioning of the detection element with increased accuracy, high rigidity and excellent shake resistance, easy assembly, improvements in detection accuracy in view of the magnetic field generated by the rotating electrical machine itself, and the like is required for a conventional controller-integrated rotating electrical machine unlike a controller provided separately from the rotating electrical machine.

SUMMARY OF THE INVENTION

This invention has been accomplished in view of the above-described circumstances, and an object thereof is to realize an easy assembly structure of a current detection unit including a detection element. Another object of this invention is to realize a constitution achieving positioning of the detection element with high accuracy, high rigidity and excellent shake resistance, and improvements in detection accuracy in view of magnetic field generated by the rotating electrical machine itself.

A controller-integrated rotating electrical machine according to this invention comprises: a rotating electrical machine main body; a power element disposed adjacent and in parallel to the rotating electrical machine main body in a longitudinal direction of a rotor shaft axis of the rotating electrical machine main body and controlled to perform control of energization to the rotating electrical machine main body; a control circuit disposed adjacent and in parallel to the power element in the longitudinal direction and at a side opposite to the rotating electrical machine main body to control the power element; a power line connecting the rotating electrical machine main body to the power element and having a straight line portion having a substantially straight line shape; and a current detector disposed at the straight line portion and detecting a current flowing between the power element and the rotating electrical machine main body via the power line at the straight line portion so that an output from the current detector is used by the control circuit for the energization control.

This invention has an effect of realizing easy assembly of the current detector including the detection element and enables realization of highly accurate positioning of the detection element, high rigidity and excellent shake resistance, and improvement in detection accuracy in view of a magnetic field generated by the rotating electrical machine itself.

According to this invention, since it is possible to assemble the magnetism detection element and the core from one direction with respect to an axial direction of the rotating electrical machine, easy production is realized. Also, by integrating the magnetism detection element in a control substrate to thereby separate the magnetism detection element from the power unit on which the core is disposed, it is possible to suppress influences of switching noise and the magnetic field generated by the rotating electrical machines, exerted on the control circuit, thereby preventing erroneous operation. Further, since it is possible to suppress a positioning error of the magnetism detection element, the core, and a conductor, this invention achieves effects of improving detection accuracy, elimination of complicated member otherwise required for improving rigidity of mounting portion of the core, and the like which have not been achieved in the art.

DESCRIPTION OF THE PREFERRED EMBODIMENTS

First Embodiment

Figure 1:
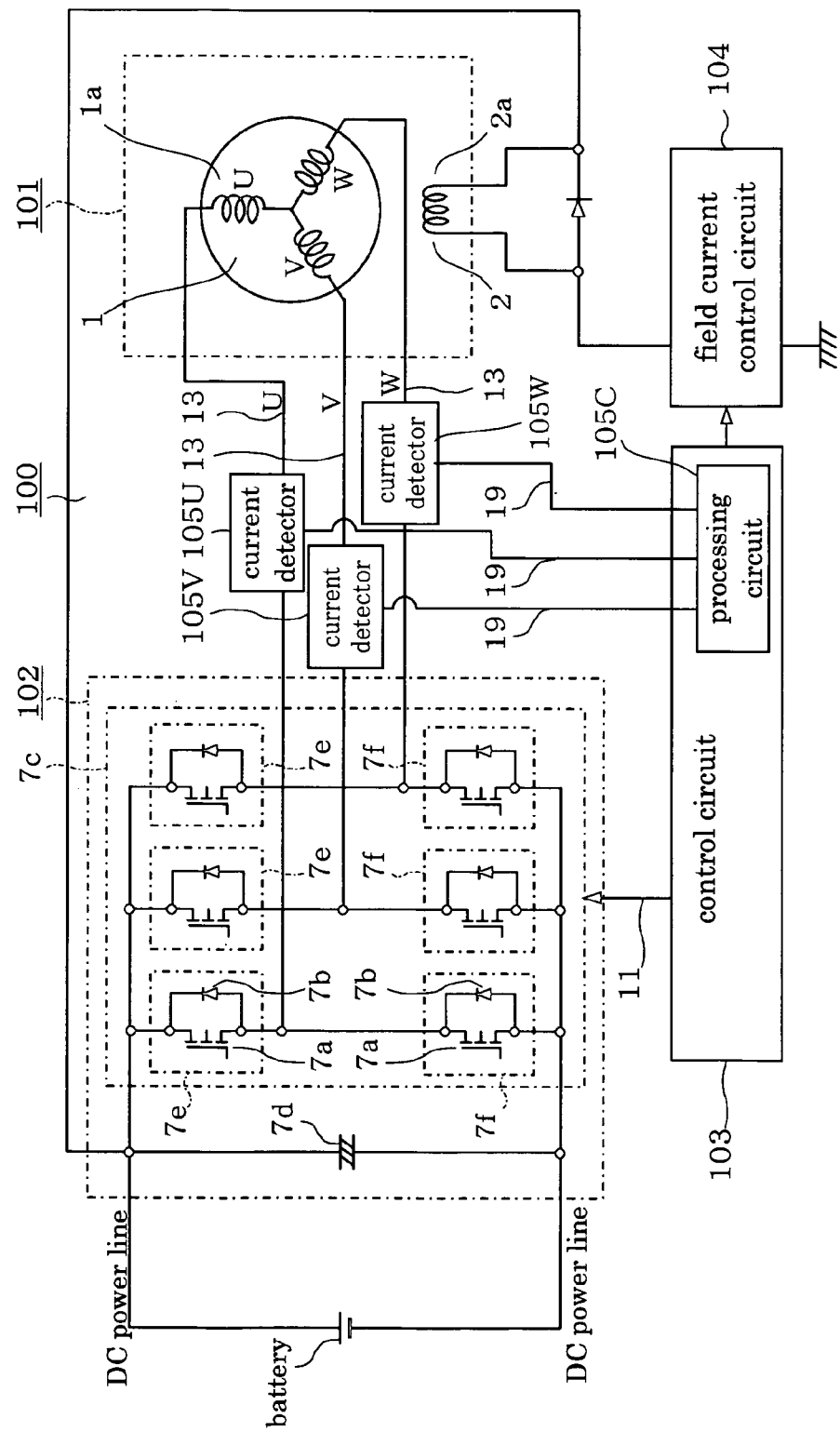
FIG. 1 is a diagram for illustrating a first embodiment of this invention, wherein one example of connection between a coil of a rotating electrical machine main body and a control circuit is shown.
Figure 2:
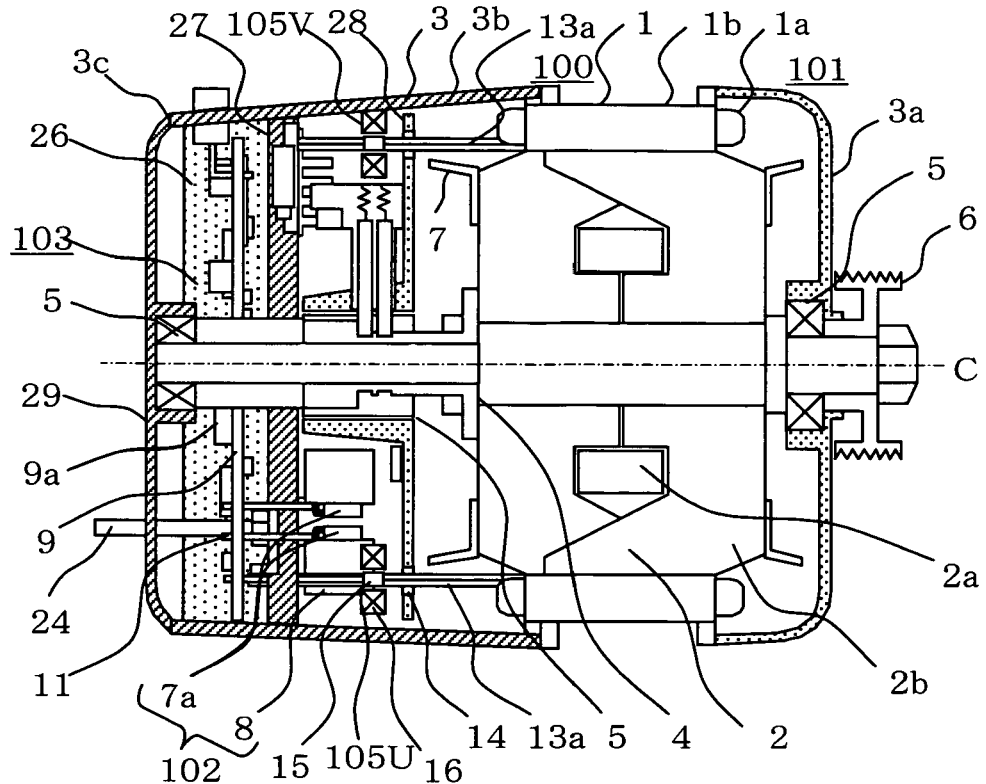
FIG. 2 is a diagram for illustrating the first embodiment of this invention, which is a longitudinal side view showing an overall controller-integrated rotating electrical machine.
Figure 3:
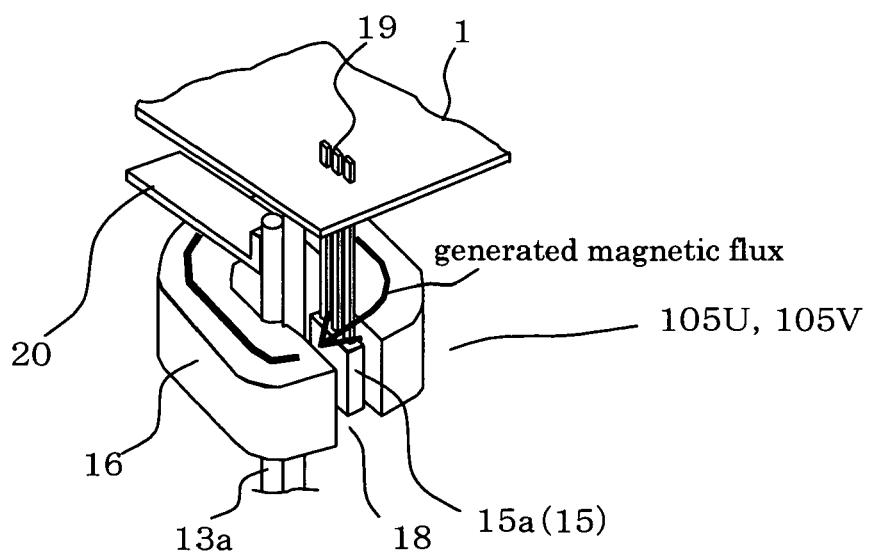
FIG. 3 is a diagram for illustrating the first embodiment of this invention, which is an enlarged perspective view showing a current detector of FIG. 2.

Hereinafter, a first embodiment of this invention will be described with reference to FIGS. 1 to 3. FIG. 1 is a diagram showing one example of connection between a coil of a rotating electrical machine main body and a control circuit. FIG. 2 is a longitudinal side view showing an overall controller-integrated rotating electrical machine. FIG. 3 is an enlarged perspective view showing a current detector in FIG. 2. In the drawings, component parts denoted by an identical reference numeral are identical with each other.

Referring to FIG. 1, a controller-integrated rotating electrical machine 100 is mainly provided with a rotating electrical machine main body 101, a power unit 102 performing energization control of an armature coil 1a of the rotating electrical machine main body 101, a control circuit 103 so controlling the power unit 102 as to cause the power unit 102 to perform the energization control, and a field current control circuit 104 controlled by the control circuit 103 and controlling a current of a field coil 2a of the rotating electrical machine main body 101.

The rotating electrical machine main body 101 is provided with the armature coil 1a of a stator 1 and the field coil 2a of a rotor 2, to which a pulley 6 (see FIG. 2 described later in this specification) connected to the rotor 2 is connected by a rotation shaft (not shown) of an engine and a belt (not shown). The armature coil 1a is formed by Y-connecting (star connecting) three coils of three phases (U-phase, Y-phase, W-phase) as shown in FIG. 1.

As shown in FIG. 1, the power unit 102 is provided with an inverter module 7c having plural power elements 7a and diodes 7b connected parallelly to the power elements 7a and a condenser 7d connected parallelly to the inverter module 7c. The inverter module 7c has three sets of upper arms 7e and lower arms 7f. Each of the upper arms 7e is constituted of the power element (switching element) 7a and the diode 7b, and each of the lower arms 7f is constituted of the power element (switching element) 7a and the diode 7b. The upper arm 7e and the lower arm 7f are connected serially to form one set, and the three sets of the upper arms 7e and the lower arms 7f are connected parallelly to one another. Examples of the power element 7a include a switching element such as a power transistor, an MOSFET, and an IGBT. In the case where a diode structure inside the switching element is utilized, the switching element and the diode may be substituted by one power element.

As shown in FIG. 1, each of ends of the three phases of the Y-connection of the armature coil 1a is electrically connected via a corresponding one of AC power lines 13 to a corresponding one of midpoints of the power elements 7a of the upper arm 7e and the power elements 7a of the lower arm 7f serially connected to the upper arm 7e.

As shown in FIG. 1, a positive terminal and a negative terminal of the battery are electrically connected to a positive side and a negative side of the inverter module 7c via a DC power line.

As shown in FIG. 1, current detector 105U, 105V, and 105W are provided in a U-phase, a V-phase, and a W-phase of the AC power lines 13, and each of outputs therefrom is taken out from corresponding one of output lead terminals 19 to be taken in by the control circuit 103 via a processing circuit 105C for processing the outputs, so that the outputs are used for the energizing control by the control circuit 103. The processing circuit 105C amplifies the outputs of the current detector 105U, 105V, and 105W and derives from the outputs a U-phase current, a V-phase current, and a W-phase current of the power lines 13 by vector calculation and the like. The U-phase current detector 105U and the V-phase current detector 105V are shown in the longitudinal side view of FIG. 2 described later in this specification, and the W-phase current detector 105W is not shown in FIG. 2 since it is disposed at a position not shown. The current detector 105U, 105V, and 105W are disposed in such a fashion as to surround a rotor shaft 4 (see FIG. 2) in a circumferential direction with an interval on a plane orthogonal to the rotor shaft 4.

In the inverter module 7C, switching operation of the power elements 7a is controlled by an instruction from the control circuit 103 through a signal lead line 11. The control circuit 103 controls the field current control circuit 104 to adjust the field current to be supplied to the field coil 2a.

In the controller-integrated rotating electrical machine 101 provided with the power unit 102 described above, DC power is supplied to the power unit 102 from the battery via the DC power line at the time of engine start in the case where the controller-integrated rotating electrical machine 101 is of in-vehicle type. Then, the control circuit 103 controls on/off of the power elements 7a of the inverter module 7c to convert the DC power into a three phase AC power. The three phase AC power is supplied to the armature coil 1a via the power lines 13. Thus, a rotating magnetic field is applied around the field coil 2a of the rotor to which the field current is supplied from the field current control circuit 104, so that the rotor 2 is driven to start the engine via a pulley for the rotating electrical machine, a belt, a crank pulley, and a clutch (ON-state).

After the start of the engine, rotational power is transmitted to the controller-integrated rotating electrical machine 100 via the crank pulley, the belt, and the rotating electrical machine pulley 6. Thus, the rotor 2 is rotationally driven to induce the three phase AC voltage on the armature coil 1a. The control circuit 103 controls on/off of the power elements 7a to convert the three phase AC power induced on the armature coil 1a into DC power, thereby charging the battery with the DC power and driving other in-vehicle auxiliaries.

Hereinafter, a constitution of the controller-integrated rotating electrical machine 100 will be described.

The stator 1 and the rotor 2 of the rotating electrical machine main body 101 are housed in a housing 3. The housing 3 is provided with a front housing 3a and a rear housing 3b. A bearing 5 at a rear side of the rotor shaft 4 is supported by a cover 19 covering an opening 3c of a rear side of the rear housing 3b, and a bearing 5 at a front side of the rotor shaft 4 is supported by the front housing 3a.

The rotating electrical machine main body 101 in this invention is connected to a load (not shown) such as the engine by means of the pulley 6 via the belt (not shown), and outputs from the rotating electrical machine main body 101 are transmitted on the belt to drive the load. In some cases, the rotating electrical machine main body 101 generates power by loading motion via the belt.

A commutation plate 28 is disposed inside the rear housing 3b on an opposed side of the pulley 6. The power unit 102 having the power elements 7a for controlling the current of the armature coil 1a of the rotating electrical machine main body 101 mounted on a heat sink 8 is attached to the commutation plate 28.

The control circuit 103 for driving the power elements 7a is incorporated into a control substrate 9. The control substrate 9 is attached to a holding member 27 which is positioned at a rear side of the power elements 7a and attached to the rear housing 3b. For the purpose of protection from dew condensation, the control substrate 9 and the control circuit 103 are sealed with a sealing resin 26.

The power elements 7a and the control circuit 103 on the control substrate 9 are connected to each other via the signal lead line 11. The armature coil 1a is formed on the stator 1, and a coil end 13a of the armature coil 1a is used as the power line 13 and connected to the power elements 7a of the power unit 102 after passing through a through-hole 14 formed on the commutation plate 28. The coil end 13a is led out straight toward an anti-load side (rear side) and in parallel to the rotor shaft 4 to form a straight line portion of the power line 13.

The control circuit 103 on the control substrate 9 is provided with a drive circuit for driving gates of the power elements 7a of the inverter module 7c (see FIG. 1), a protection circuit, a control circuit for controlling the outputs of the rotating electrical machine main body 101, and the like, and the current detector 105U, 105V, and 105W (disposed at the position not shown) are provided for the purpose of performing the protection and control by the use of the circuits. Each of the current detector 105U, 105V, and 105W is provided with a detection element 15, a processing circuit 105C (see FIG. 1) for processing outputs from the output lead terminal 19 of the detection element 15. The output lead terminal 19 of the detection element 15 is soldered on the control substrate 9 to be integrated with the control substrate 9.

Though not shown in the drawings, the current detector of the above-described constitution is used for detecting a DC current of the DC power line which is used as an input/output line of the battery (see FIG. 1), a field current supplied to the field coil 2a, and the like.

The detection element 15 is a magnetism responsive detection element detecting, by a Hall effect or a magneto resistance effect, a magnetic flux density generated around a conductor (the straight line portion 13a of the power line 13 in FIGS. 1 and 2) in which the current flows, and has a core 16 provided around the conductor for the purpose of drawing magnetism.

One example of position relationship among the coil end (straight line portion) 13a of the armature coil 1a, the core 16, and a package 15a of the magnetism responsive detection element 15 is shown in FIG. 3. The detection element 15 is a Hall element provided with the lead terminal 19 in the example shown in FIG. 3.

An air gap 18 is defined at a portion of the core 16 provided around the coil end 13a of the armature coil 1a, and the package 15a of the magnetism responsive detection element 15 is inserted into the air gap 18 to be fixed. The current flowing in the coil end 13a forms a strong magnetic flux oriented in a direction indicated by an arrow in FIG. 3 inside the core 16 having a high magnetic permeability, and the magnetic flux penetrates through the magnetism responsive detection element 15 such as the Hall element disposed in the air gap 18. Since the magnetic flux density penetrating the magnetism responsive detection element 15 is proportional to the current, it is possible to detect an amount of the current in the armature coil 1a from the output of the magnetism responsive detection element 15.

The core 16 is assembled in such an easy manner that the core 16 is inserted from an tip at the rear side of the coil end (the straight line portion of the power line 13) 13a extending parallelly to the rotor shaft 4 of the rotating electrical machine main body 101 to surround the coil end (the straight line portion of the power line 13) 13a without interference by other component parts. The core 16 may be attached to various component parts. For instance, the core 16 may be attached to the commutation plate 28, the holding member 27, or the rear housing 3b to be fixed thereto, and the attachment position may be changed flexibly in accordance with designing.

Thanks to the controller-integrated rotating electric machine 100 according to the first embodiment of this invention provided with the rotating electrical machine main body 101, the power elements 7a which are disposed adjacent and parallelly to the rotating electrical machine main body 101 in a longitudinal direction of the axis C of the rotor shaft 4 of the rotating electrical machine main body 101 and controlled to control energization to the rotating electrical machine main body 101, the control circuit 103 which is disposed adjacent and parallelly to the power elements 7a in the longitudinal direction at the position opposed to the rotating electrical machine main body 101 and controls the power elements, the power line 13 which connects the rotating electrical machine main body 101 to the power elements 7a and has the straight line portion 13a having the substantially straight line form, and the current detector 105 which is disposed in the straight line portion 13a to detect a line current flowing through the power line 13 between the power elements 7a and the rotating electrical machine main body 101 at the straight line portion 13a so that the output thereof is used for the energizing control by the control circuit 103, the current detector 105 is readily mounted on the controller-integrated rotating electrical machine 100, and a length of the power line 13 is reduced.

As described in the foregoing, since the power elements 7a and the current detector 105 are disposed between the rotating electrical machine main body 101 and the control circuit 103 in the controller-integrated rotating electrical machine 100 according to the first embodiment of this invention, it is possible to perform linear assembly with high accuracy by mounting the core 15 of the current detector 105 and then the control circuit 103 on the rotating electrical machine main body 101 in this order.

Also, as compared to the case of disposing the control circuit 103 between the power elements 7a/the current detector 105 and the rotating electrical machine main body 101, the control circuit 103 is not influenced by heat of both of the rotating electrical machine main body 101 and the power elements 7a. Therefore, reliability of the control circuit 103 is improved, and a length of the power line 13 is reduced.

Also, in the controller-integrated rotating electrical machine 100 according to the first embodiment of this invention: the current detector 105 is provided with the core 16 which surrounds the straight line portion 13a and serves as a passage for the magnetic flux generated by the current flowing through the straight line portion 13a and the detection element 15 producing an output corresponding to intensity of the magnetic flux of the core 16; the output lead terminal 19 of the detection element 15 is integrally connected to the control circuit 103; and the core 16 is disposed at the side of the power elements 7a, therefore, it is possible to electrically separate the control circuit 103 from a main circuit of the power unit 102 in which the core 16 is provided, thereby preventing noise from entering the control circuit 103 from the main circuit of the power unit 102.

Also, since the straight line portion 13a is the coil end of the armature coil 2a of the rotating electrical machine main body 101 in the controller-integrated rotating electrical machine 100 according to the first embodiment of this invention, it is possible to reduce the number of component parts.

Also, since the power elements 7a, the control circuit 103, and the current detector are incorporated into the housing 3 retaining the bearing 5 of the rotor shaft 4 in the controller-integrated rotating electrical machine 100 according to the first embodiment of this invention, it is possible to reduce the number of component parts as compared to the case of housing the power elements 7a, the control circuit 103, and the current detector in different housings.

Second Embodiment

Hereinafter, a second embodiment of this invention will be described with reference to FIG. 4 which is a longitudinal side view showing an overall controller-integrated rotating electrical machine. Component parts identical or equivalent to those of FIGS. 1 to 3 are denoted in FIG. 4 by reference numerals same as those used in FIGS. 1 to 3, and differences from the above-described first embodiment of this invention are mainly described in the following description to omit description other than that of the differences.

Figure 4:
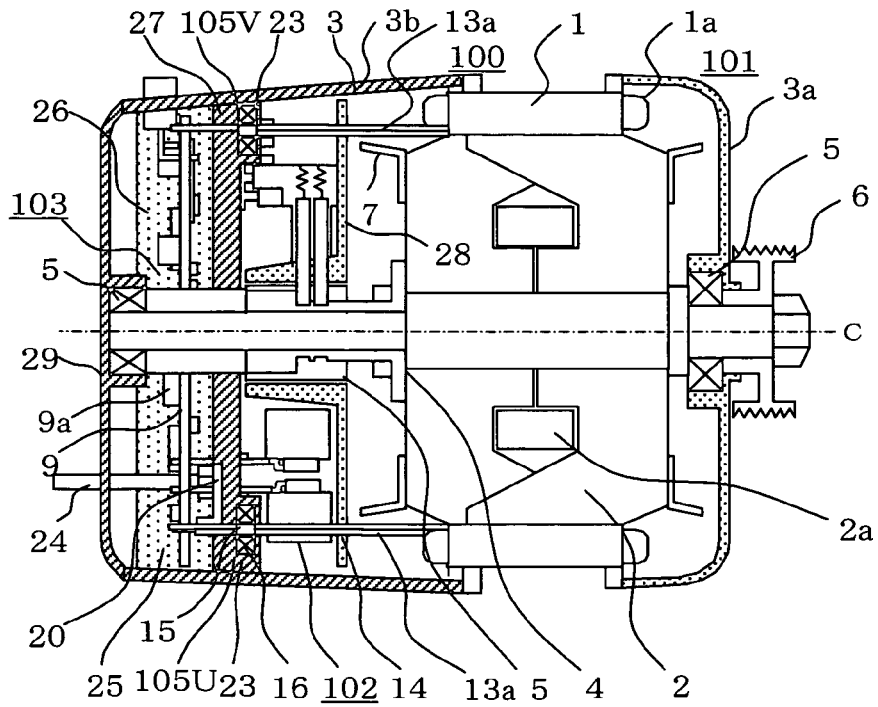
FIG. 4 is a diagram for illustrating a second embodiment of this invention, which is a longitudinal side view showing an overall controller-integrated rotating electrical machine.

As shown in FIG. 4, a thickened portion 23 is formed as a part of a holding member 27 made from a resin, and a core 15 is included inside the thickened portion 23. The core 15 is formed by insertion molding in molding the holding member 27. The holding member 27 is provided with a bus bar 20 serving as a connection conductor connecting a coil end (power line) of the armature coil 1a and the power elements 7a to each other, an external connection terminal 24, and the like as required.

With such constitution, it is possible to fix the core 16 on the rotating electrical machine. Also, the core is improved in water resistance and rust resistance, thereby realizing a highly reliable assembly structure.

From a different point of view, the holding member 27 is a holding member commonly used for the control circuit 103, the core 16, the bus bar 20 and the external connection terminal 24. Since the plural cores 16, 16 are fixed by the insertion molding with the use of the common holding member 27: it is unnecessary to use component parts for respectively fixing the cores; mutual position accuracy of the component parts relating to the current detection is improved; coherent fluctuation of each component part is reduced; and a structure having high rigidity and excellent shake resistance is realized. Further, since the detection element 15 and the core 16 are disposed distant from the rotating electrical machine main body 101, the detection element 15 and the core 16 are free from influence of the magnetic field generated by the rotating electrical machine main body 101 itself, to thereby realize a structure improving detection accuracy.

Third Embodiment

Figure 5:
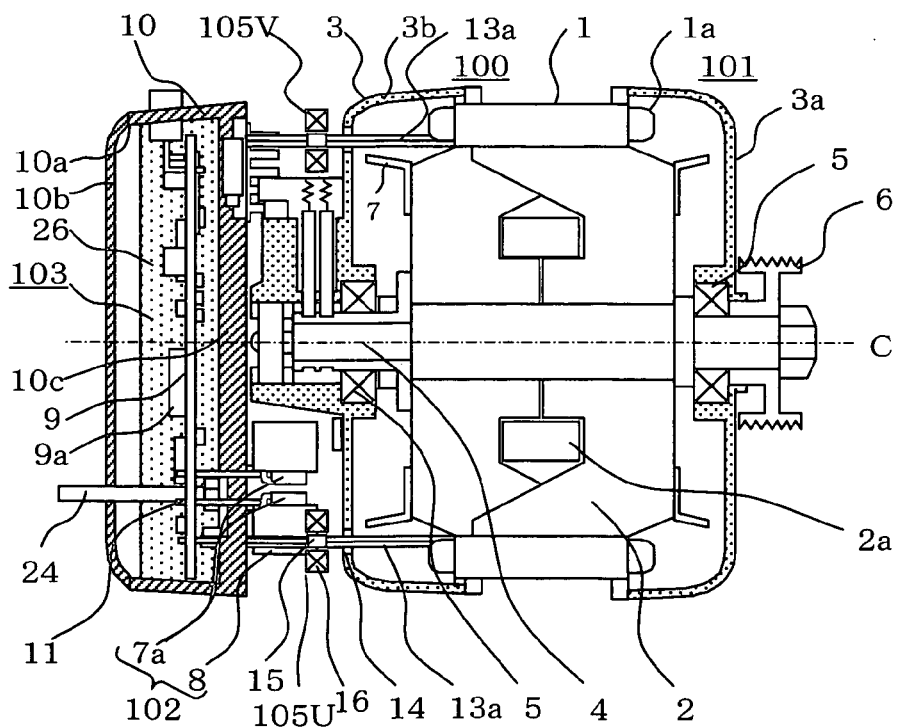
FIG. 5 is a diagram for illustrating a third embodiment of this invention, which is a longitudinal side view showing an overall controller-integrated rotating electrical machine.
Figure 6:
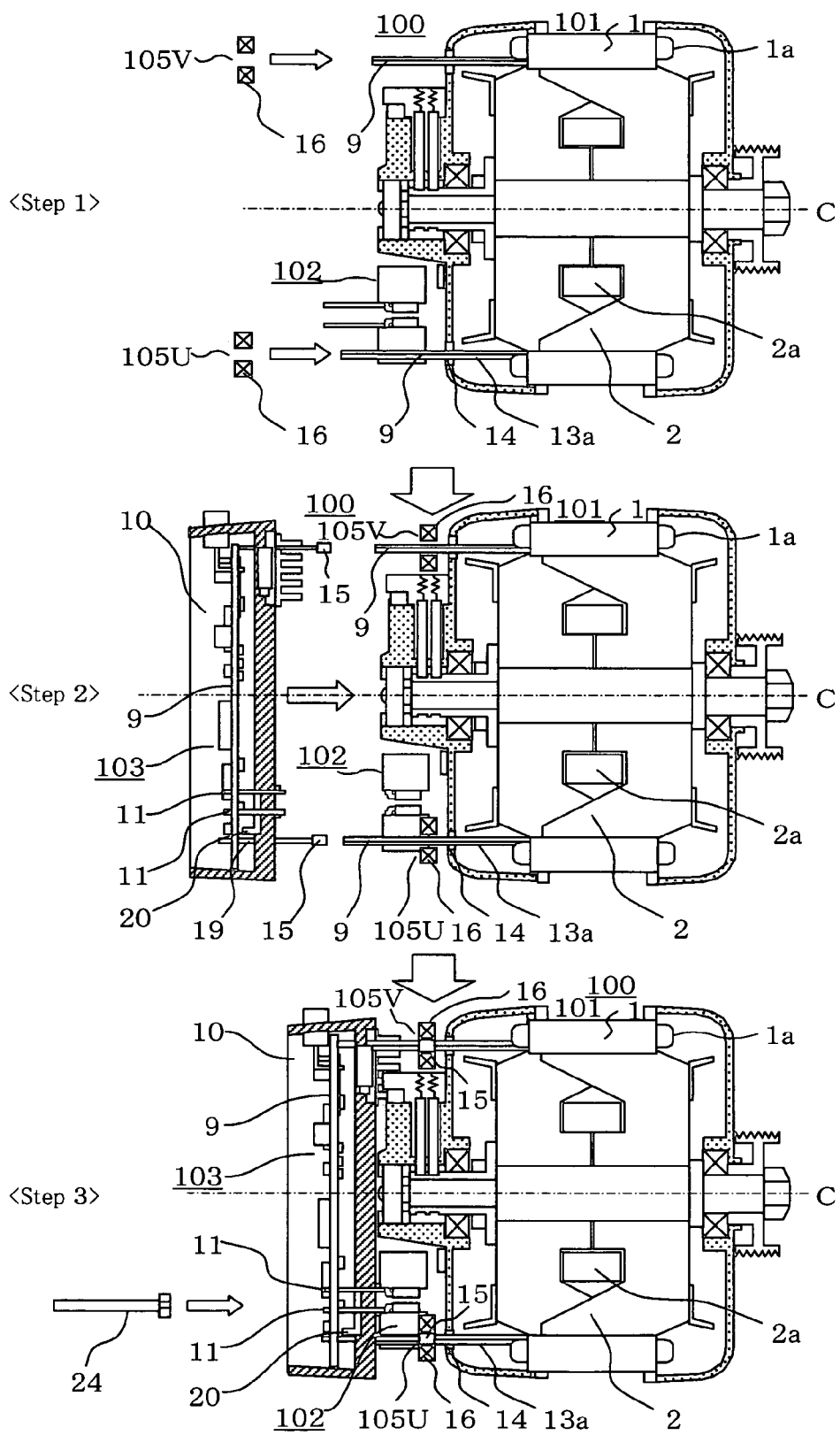
FIG. 6 is a diagram for illustrating the third embodiment of this invention, wherein an assembly process of the controller-integrated rotating electrical machine of FIG. 5 is shown.
Figure 7:
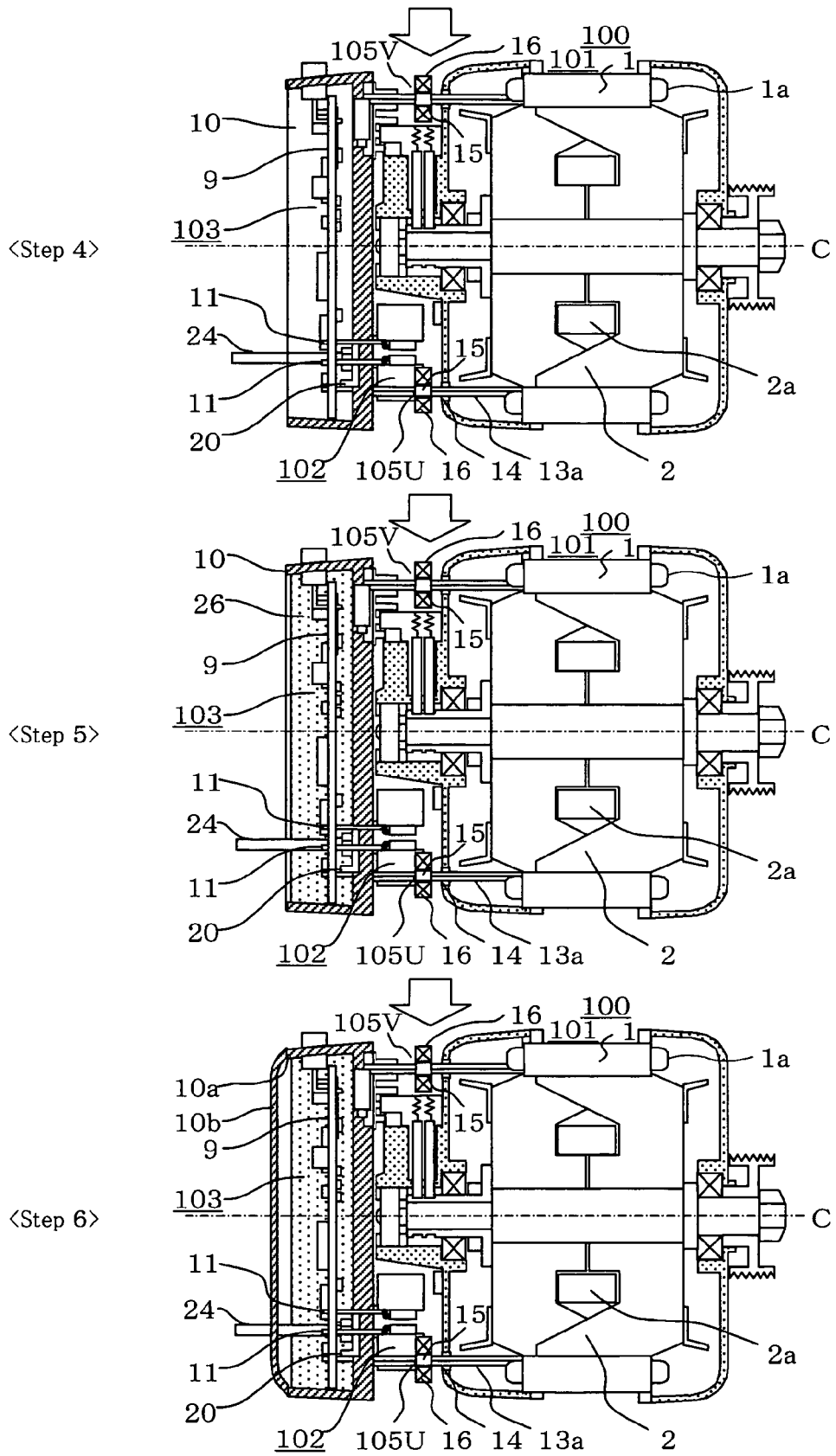
FIG. 7 is a diagram for illustrating the third embodiment of this invention, wherein an assembly process performed subsequently to that of FIG. 6 is shown.

Hereinafter, a third embodiment of this invention will be described with reference to FIGS. 5 to 7. FIG. 5 is a longitudinal side view showing an overall controller-integrated rotating electrical machine. FIG. 6 is a diagram for illustrating an assembly process of the controller-integrated rotating electrical machine of FIG. 5. FIG. 7 is a diagram for illustrating an assembly process performed subsequently to that of FIG. 6. Component parts identical or equivalent to those of FIGS. 1 to 3 are denoted in FIGS. 5 to 7 by reference numerals same as those used in FIGS. 1 to 3, and differences from the above-described first embodiment of this invention are mainly described in the following description to omit description other than that of the differences. A rotating electrical machine main body shown in FIGS. 5 to 7 is the same as the field coil type rotating electrical machine shown in FIGS. 1 to 4.

Unlike the FIG. 2 of the first embodiment, the power unit 102, the control circuit 103, and the current detector 105 are disposed outside the anti-load side (rear side) of the housing 3 in the third embodiment, wherein the control circuit 103 at a backmost part (rearmost side) is housed in a case 10 which is independent from the housing 3, and the housing 3 houses the stator 1 and the rotor 2. Since the housing 3 houses only the stator 1 and the rotor 2 in this embodiment, the rotor shaft 4 supported by the bearings 5, 5 does not penetrate through the control circuit 103, though the rotor shaft 4 penetrates the control circuit 103 in the first embodiment.

Hereinafter, an assembly process of the controller-integrated rotating electrical machine 100 shown in FIG. 5 will be described with reference to FIGS. 6 and 7 in the order of assembly process steps.

The coil end 13a of the armature coil 1a of the stator 1 is in the form of a straight line extending in parallel to an axis C of the rotor shaft 4 in the anti-load direction of the rotating electrical machine main body 101. The core 16 is inserted into an tip (end at the anti-load side) of the coil end 13a having the straight line shape in a direction from the anti-load side to the load side in a longitudinal direction of the coil end 13a as indicated by an arrow (Step 1 in FIG. 6).

Then, the detection element 15 having the case 10, the control substrate 9 assembled to the case 10 in advance, and the output lead terminal 19 soldered on the control substrate 9 is moved from the anti-load side to the load side along with a movement of the case 10 from the anti-load side to the load side as indicated by an arrow (Step 2 of FIG. 6).

The case 10 is moved further from the anti-load side to the load side until the case 10 reaches to a predetermined position at which the case 10 is inserted into the air gap 18 (see FIG. 3) of the core 16 to be fixed to the housing 3 at the predetermined position. By the fixing of the case 10 to the housing 3, a predetermined position relationship between the detection element 15 and the air gap 18 is established (Step 3 in FIG. 6).

Each of the U-phase current detector 105U, the V-phase current detector 105V, and the W-phase current detector 105W (not shown) are assembled to the corresponding core 16 by the above-described Steps 1 to 3.

Alternatively, the above assembly steps may be such that the case 10 is fixed to the housing 3, and then the control substrate 9 on which the detection element 15 is mounted in advance is housed in the case 10 from the anti-load side to the load side, so that the detection element 15 is moved from the anti-load side to the load side along with the housing movement to be inserted into the air gap 18 of the core 16. Alternatively, after mounting the detection element 15 on the control substrate 9, the case 10 and the control substrate 9 may be assembled in the direction from the anti-load side to the load side.

After fixing the case 10 to the housing 3, a tip portion of the coil end 13a of the stator 1 is soldered on the bus bar 20 in advance attached to the case 10 to electrically connect the coil end 13a to the bus bar 20. Then, the bus bar 20, the power element 102, and the external connection terminal 24 are connected to one another, followed by connecting the signal lead line 11 in advance attached to the control substrate 9 to a gate (not shown) of the power element of the power unit 102 (Step 4 of FIG. 7).

The connection of the coil end (straight line portion) 13a to the bus bar 20, the connection of the bus bar 20 to the power unit 102, the connection of the signal lead line 11 to the gate of the power element of the power unit 102 are performed for each of the phases.

Next, the case 10 is filled with the resin to mold the control circuit 103 and the control substrate 9 by the resin filling from the anti-load side to the load side of the control substrate 9 (Step 5 of FIG. 7).

After the resin filling in Step 5, the opening 10a of the case 10 is covered with a cover 10b (Step 6 of FIG. 7).

By assembling the core 16 to the coil end (straight line portion) 13a by penetrating the core 16 through the coil end 13a as described above, it is possible to assemble the component parts linearly in the direction (longitudinal direction) in which the rotor shaft 4 of the rotating electrical machine main body 101 extends, thereby realizing an easy assembly and high assembly accuracy.

Fourth Embodiment

Figure 8:
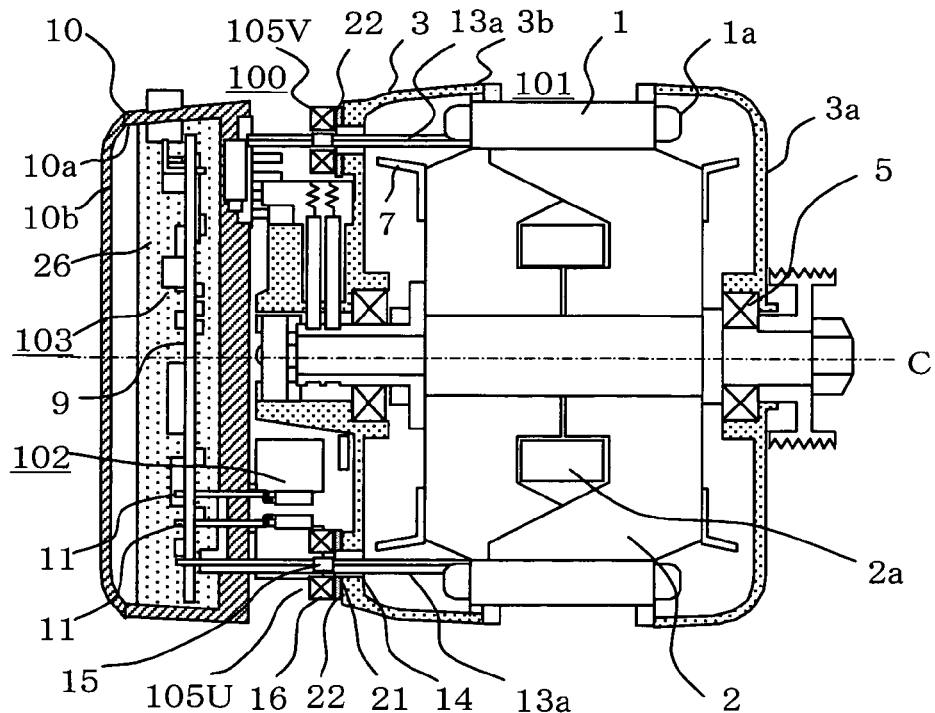
FIG. 8 is a diagram for illustrating a fourth embodiment of this invention, which is a longitudinal side view showing an overall controller-integrated rotating electrical machine.

Hereinafter, a fourth embodiment of this invention will be described with reference to FIG. 8 which is a longitudinal side view showing an overall controller-integrated rotating electrical machine. Component parts identical or equivalent to those of FIGS. 1 to 7 are denoted in FIG. 8 by reference numerals same as those used in FIGS. 1 to 7, and differences from the above-described first to third embodiments of this invention are mainly described in the following description to omit description other than that of the differences.

The fourth embodiment is one example of a constitution wherein the core 16 is mounted on the housing 10. In this embodiment, a base 21 is formed around the through-hole 14 of the housing 3 as shown in FIG. 8, and an insulating layer 22 is formed on the base 21 in order to attach the core 16 on the insulating layer 22. In so far as the insulating layer 22 is an adhesive layer to be used for adhering the core 16 to the housing 3 or a laminate material having an insulating resin as a core and adhesive layers formed on each of surfaces of the core, it is possible to fix the core 16 directly on the housing 3 and to achieve satisfactory insulation property and fixing strength.

Fifth Embodiment

Hereinafter, a fifth embodiment of this invention will be described with reference to FIG. 9 which is a longitudinal side view showing an overall controller-integrated rotating electrical machine. Component parts identical or equivalent to those of FIGS. 1 to 8 are denoted in FIG. 9 by reference numerals same as those used in FIGS. 1 to 8, and differences from the above-described first embodiment of this invention are mainly described in the following description to omit description other than that of the differences.

Figure 9:
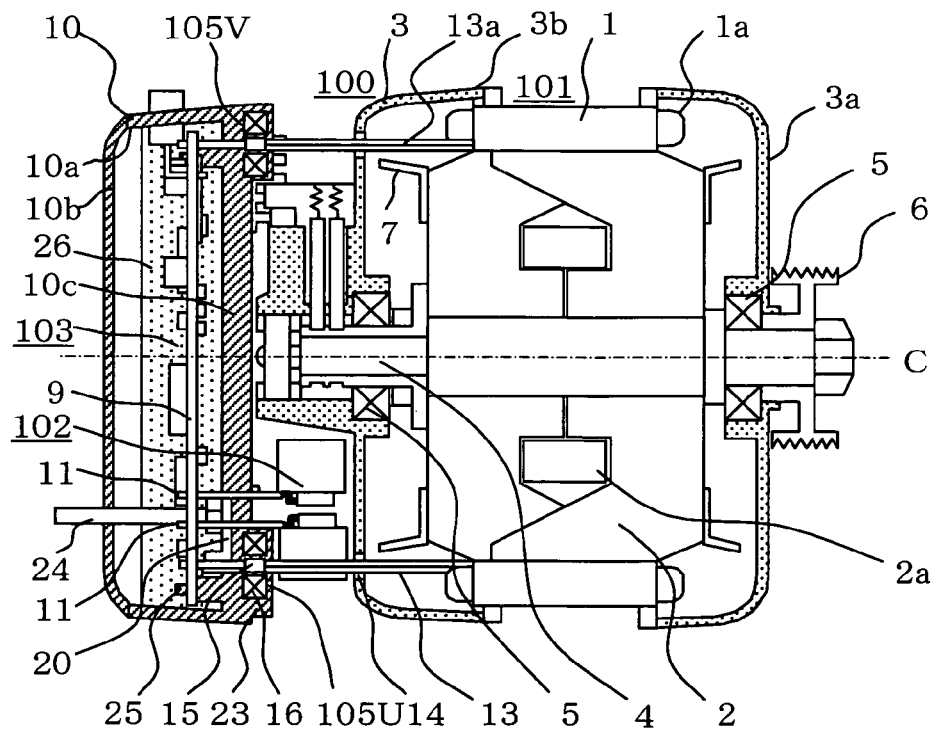
FIG. 9 is a diagram for illustrating a fifth embodiment of this invention, which is a longitudinal side view showing an overall controller-integrated rotating electrical machine.

Referring to FIG. 9, the control substrate 9 is housed in the case 10, and the signal lead line 11 for gate driving extending from the power unit 102 to the control substrate 9 and the signal lead line 11 for voltage monitoring are connected to the control circuit 103 on the control substrate 9 after penetrating through the case 10.

The bus bar 20 having a main wiring is inserted into the case 10 to be held by the case 10, and the connection terminal 24 for external connection is disposed in the case 10. The external wiring 24 and the bus bar 20 extending from the external component part such as the battery are connected to each other by using the case 10 as a supporting structure. The thickened portion 23 is formed as a part of the case 10, and the core 16 is attached to the thickened portion 23 of the case 10 in the same manner as in the insertion molding of the bus bar 20.

The tip of the coil end 13a of the stator coil penetrates through a wall (holding member) 10c at the load side of the case 10 at the same time with penetrating through the core 16 attached to the case 10 by the insertion molding to be connected to the bus bar 20 attached to the case 10 by the insertion molding.

At least two positioning projections 25 are formed on the case 10 by integral molding with the case 10, and throughholes or blind holes (not shown) into which the projections 25 are fitted are formed on the control substrate 9. When mounting the control substrate 9 on the case 10, the projections 25 are inserted into the holes for positioning in order to house the control substrate 9 in the case 10. Members other than the projections may be fixed to the case 10 for the purpose of the positioning of the control substrate 9. The above-described assembly of the control substrate 9 is also performed in the first to fourth embodiments.

As described in the foregoing, the core 16 is integrally held by the case 10 by the insertion molding, it is unnecessary to add another component part for holding and fixing the core 16. Therefore, it is possible to attach the core 16 to the rotating electrical machine with high accuracy and rigidity. Also, since the core 16 is assembled by the insertion molding together with the bus bar 20, it is unnecessary to increase the number of process steps. Further, since the control substrate is mounted with high accuracy by the use of the positioning structure described above, positioning of the core 16 and the detection element 15 is performed with high accuracy in view of a relative position relationship therebetween, thereby increasing detection accuracy.

Sixth Embodiment

Figure 10:
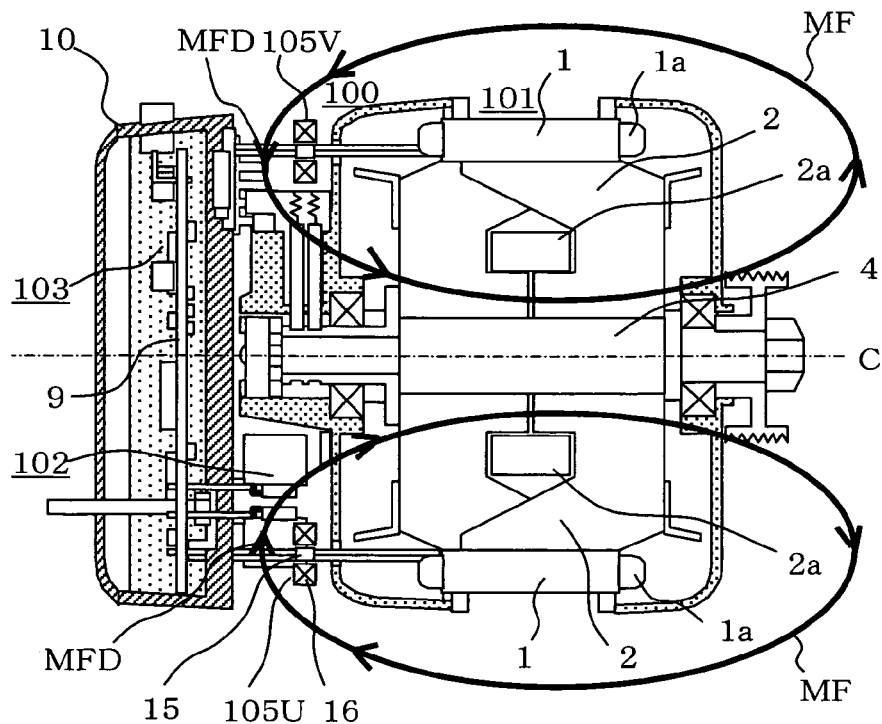
FIG. 10 is a diagram for illustrating a sixth embodiment of this invention, which is a longitudinal side view showing an overall controller-integrated rotating electrical machine and indicating that a rotor coil generates a magnetic field in a radial direction.
Figure 11:
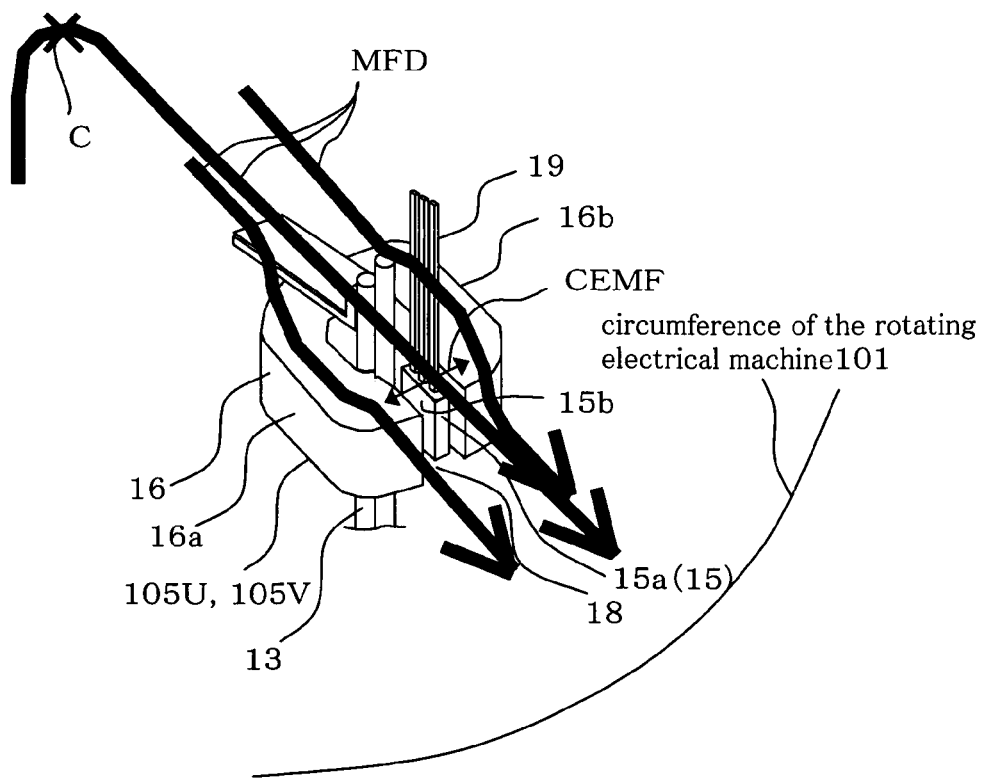
FIG. 11 is a diagram for illustrating the sixth embodiment, which is a perspective view showing a relationship between the magnetic field generated by the rotor coil and the current detector.

Hereinafter, a sixth embodiment of this invention will be described with reference to FIGS. 10 and 11. FIG. 10 is a longitudinal side view showing an overall controller-integrated rotating electrical machine and indicating that a field coil generates a magnetic field in a radial direction. FIG. 11 is a perspective view showing a relationship between the magnetic field generated by the rotor coil and the current detector. Component parts identical or equivalent to those of FIGS. 1 to 9 are denoted in FIGS. 10 and 11 by reference numerals same as those used in FIGS. 1 to 9, and differences from the above-described first to fifth embodiments of this invention are mainly described in the following description to omit description other than that of the differences.

As shown in FIG. 10, a magnetic field MF is generated by the field coil 2a in a radial direction (indicated by an arrow MFD) outside the housing 3. Therefore, the magnetic field MF occurs radially with respect to a circumference of the rotating electrical machine main body 101, and the radial magnetic field MF influences the magnetism responsive detection element 15 provided in the controller-integrated rotating electrical machine 100. In order to suppress or prevent the influence of the magnetic field MF generated by the rotating electrical machine main body 101 on the magnetism responsive detection element 15, the magnetism responsive detection element 15 and the core 16 are arranged as shown in FIG. 11.

Referring to FIG. 11, the coil end 13a of the armature coil 1a extends toward the anti-load side in the direction of extension of the axis C of the rotating electrical machine main body 101 at a position apart from the axis C by an arbitrary distance in a radial direction. The magnetism responsive detection element 15 is disposed in the air gap 18 of the C-shaped core 16 disposed in such a fashion as to enclose the coil end 13a in order to detect a line current flowing on the armature coil 1a.

As shown in FIG. 11, the air gap 18 is formed in such a fashion that the center of the air gap 18 substantially overlaps with a straight line passing through the axis C of the rotating electrical machine main body 101 and the center of the C-shaped core 16, and the magnetism responsive detection element 15 is disposed in such a fashion that the straight line is substantially parallel to the detection face of the magnetism responsive detection element 15. In other words, the core 16 and the detection element 15 are arranged in such a fashion that a magnetic flux CEMF generated by the current flowing on the coil end 13a and passing through the detection element 15 is substantially perpendicular to the radial direction of the rotating electrical machine main body 101.

The magnetic field generated by the rotor 2 or the stator 1 of the rotating electrical machine main body 101 occurs radially in the radial direction MFD outside the housing as indicated by the arrow in FIG. 10. By arranging the magnetism responsive detection element 15 as shown in FIG. 11, the magnetic flux of the rotating electrical machine main body 101 is not formed on the detection surface, thereby enabling to reduce the influence of the magnetic field generation of the rotating electrical machine. Also, by arranging the core 16 as shown in FIG. 11, the magnetic flux in the radial direction of the rotating electrical machine main body 101 escapes outside of the magnetism responsive detection element 15 after bypassing the both arms 16a and 16b, so that the magnetic flux does not invade on the detection surface 15b of the magnetism responsive detection element 15 nor influence on the outputs of the magnetism responsive detection element 15. Further, even if the magnetic flux in the radial direction of the rotating electrical machine main body 101 leaking due to imperfect bypassing is generated by the current flowing on the coil end 13a to somewhat influence on the magnetic flux CEMF passing through the detection element 15, it is possible to accurately extract the magnetic flux CEMF generated by the current flowing on the coil end 13a and passing thought the detection element 15 by performing a vector analysis, for example, of the outputs of the magnetism responsive detection element 15 thanks to the intersection of the leaked magnetic flux in the radial direction of the rotating electrical machine main body 101 and the magnetic field generated by the current flowing on the coil end 13a and passing thought the detection element 15.

As described above, since it is possible to prevent the influence of the magnetic field generated due to the coil of the rotating electrical machine main body 101, it is possible to realize high detection accuracy when the detection element 15 detecting a line current flowing on the armature coil 1a is mounted on the controller-integrated rotating electrical machine 100.

Though the rotating electrical machine main body 101 described in the first to sixth embodiments has a clay magnetic pole, a rotating electrical machine main body having a permanent magnet may be used. This invention is suitably used for the permanent magnet type rotating electrical machine main body having a strong magnet such as NdFe since influence of a rotating magnetic field on a sensor, a control circuit, and the like is great in the permanent magnet type rotating electrical machine main body.

Also, in the above-described case of adopting the current detector into the controller-integrated rotating electrical machine, it is also possible to correct outputs of the current detector by monitoring a temperature of the stator, for example. In such case, detection accuracy of the current detector is further improved by this invention.

Also, in addition to the application of this invention to the rotating electrical machine operating as a motor having a control circuit having an inverter function, the same effect is achieved when this invention is applied to an AC generator having a current detector having functions of power generation and commutation. Thus, this invention is applicable to rotating electrical machines integrated with a controller detecting a current of an armature for the control.

What is claimed is:

1. A controller-integrated rotating electrical machine comprising:
    a rotating electrical machine main body;
    a power element mounted on a heat sink, disposed adjacent and in parallel to the rotating electrical machine main body in a longitudinal direction of a rotor shaft axis of the rotating electrical machine main body together with the heat sink and controlled to perform control of energization to the rotating electrical machine main body;
    a holding member disposed adjacent and in parallel to the power element and the heat sink in the longitudinal direction and at a side opposite to the rotating electrical machine main body;
    a control circuit disposed adjacent and in parallel to the power element and the heat sink in the longitudinal direction and at a side opposite to the power element and the heat sink and supported by the holding member to control the power element;
    a power line connecting the rotating electrical machine main body to the power element and having a straight line portion having a substantially straight line shape; and
    a current detector disposed at the straight line portion and detecting a current flowing between the power element and the rotating electrical machine main body via the power line at the straight line portion so that an output from the current detector is used by the control circuit for the energization control;
    wherein
    the current detector is provided with a C-shaped core which has a gap and a detection element disposed in the gap;
    the holding member is provided with a bus bar serving as a connection conductor connecting the power line and the power element;
    the straight line portion extends into the C-shaped core from a tip of the straight line portion, and the tip is connected to the bus bar, so that the rotating electrical machine main body is connected to the power element and the C-shaped core serves as a passage for the magnetic flux generated by the current flowing through the straight line portion, and the detection element produces an output corresponding to an intensity of the magnetic flux of the core.

2. The controller-integrated rotating electrical machine according to claim 1, wherein the power element and the current detector are disposed between the rotating electrical machine main body and the control circuit.

3. The controller-integrated rotating electrical machine according to claim 2, wherein the current detector is provided with a core which surrounds the straight line portion and which is a passage for magnetic flux generated by the current flowing in the straight line portion, and with a detection element producing an output corresponding to intensity of the magnetic flux of the core, the detection element having an output lead terminal integrally connected to the control circuit, and the core being disposed at the side of the power element.

4. The controller-integrated rotating electrical machine according to claim 3, wherein the power element, the control circuit, and the current detector are disposed outside a housing retaining a bearing of the rotor shaft.

5. The controller-integrated rotating electrical machine according to claim 2, wherein the current detector is provided with a core which surrounds the straight line portion and which is a passage for magnetic flux generated by the current flowing in the straight line portion, and with a detection element producing an output corresponding to intensity of the magnetic flux of the core, the core being inserted into a holding member, disposed between the power element and the control circuit, and being held by the holding member.

6. The controller-integrated rotating electrical machine according to claim 5, wherein the power line is provided for each of a plurality of phases, and a plurality of current detectors, each detecting a current of a corresponding one of the phases, are held by a common holding member disposed between the power element and the control circuit.

7. The controller-integrated rotating electrical machine according to claims 6, wherein the straight line portion is a coil end of an armature coil of the rotating electrical machine main body.

8. The controller-integrated rotating electrical machine according to claim 1, wherein the current detector is provided with a core which surrounds the straight line portion and which is a passage for magnetic flux generated by the current flowing in the straight line portion, and with a detection element producing an output corresponding to intensity of the magnetic flux of the core, the detection element having an output lead terminal integrally connected to the control circuit, and the core being disposed at the side of the power element.

9. The controller-integrated rotating electrical machine according to claim 8, wherein the core and the detection element are disposed in such a fashion that the magnetic flux passing through the detection element is substantially orthogonal to a radial direction of the rotating electrical machine main body.

10. The controller-integrated rotating electrical machine according to claim 1, wherein the current detector is provided with a core which surrounds the straight line portion and which is a passage for magnetic flux generated by the current flowing in the straight line portion, and with a detection element producing an output corresponding to intensity of the magnetic flux of the core, the core being inserted into a holding member, disposed between the power element and the control circuit and being held by the holding member.

11. The controller-integrated rotating electrical machine according to claim 10, wherein the control circuit is held by the holding member at a predetermined position by a positioning structure.

12. The controller-integrated rotating electrical machine according to claim 1, wherein the power line is provided for each of a plurality of phases, and a plurality of current detectors, each detecting a current of a corresponding one of the phases, are held by a common holding member disposed between the power element and the control circuit.

13. The controller-integrated rotating electrical machine according to claim 12, wherein the control circuit is held by the holding member at a predetermined position by a positioning structure.

14. The controller-integrated rotating electrical machine according to claim 13, wherein the core and the detection element are disposed in such a fashion that the magnetic flux passing through the detection element is substantially orthogonal to a radial direction of the rotating electrical machine main body.

15. The controller-integrated rotating electrical machine according to claim 14, wherein the power element, the control circuit, and the current detector are housed in a housing retaining a bearing of the rotor shaft.

16. The controller-integrated rotating electrical machine according to claim 1, wherein the straight line portion is a coil end of an armature coil of the rotating electrical machine main body.

17. The controller-integrated rotating electrical machine according to claim 1, wherein the power element, the control circuit, and the current detector are housed in a housing retaining a bearing of the rotor shaft.

18. The controller-integrated rotating electrical machine according to claim 1, wherein the power element, the control circuit, and the current detector are disposed outside a housing retaining a bearing of the rotor shaft.

19. A controller-integrated rotating electrical machine comprising:

a rotating electrical machine main body;

a power element disposed adjacent and in parallel to the rotating electrical machine main body in a longitudinal direction of a rotor shaft axis of the rotating electrical machine main body and controlled to perform control of energization to the rotating electrical machine main body;

a holding member disposed adjacent and in parallel to the power element in the longitudinal direction and at a side opposite to the rotating electrical machine main body;

a control circuit disposed adjacent and in parallel to the power element in the longitudinal direction and at a side opposite to the power element and supported by the holding member to control the power element;

a power line connecting the rotating electrical machine main body to the power element and having a straight line portion having a substantially straight line shape; and a current detector disposed at the straight line portion and detecting a current flowing between the power element and the rotating electrical machine main body via the power line at the straight line portion so that an output from the current detector is used by the control circuit for the energization control;

wherein the current detector is provided with a C-shaped core which has a gap and a detection element disposed in the gap;

the holding member is provided with a bus bar serving as a connection conductor connecting the power line and the power element;

the controller-integrated rotating electrical machine is assembled in the following order of assembly steps;

Step 1: The C-shaped core is inserted into a tip portion of the straight line portion in a direction from an anti-load side to a load side in a longitudinal direction of the straight line portion;

Step 2: The detection element is moved from the anti-load side to the load side until reaching into the gap of the C-shaped core; and Step 3: The tip portion of the straight line portion is connected to the bus bar.

* * * * *